Aug. 30, 1966      K. VATTERODT      3,269,821
FURNACE FOR THE CONTINUOUS DRAWING OF QUARTZ TUBING
Filed May 22, 1963
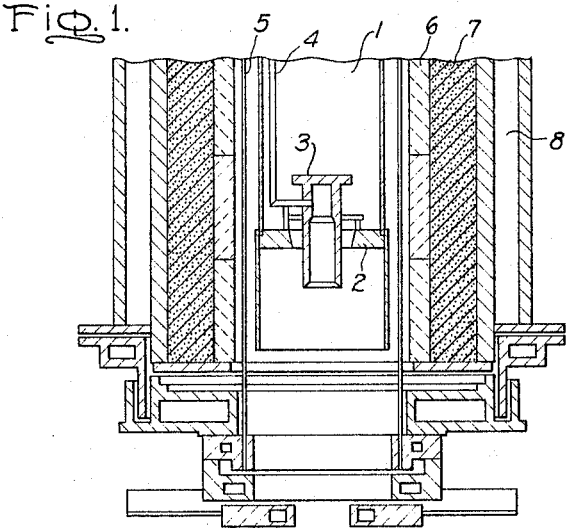
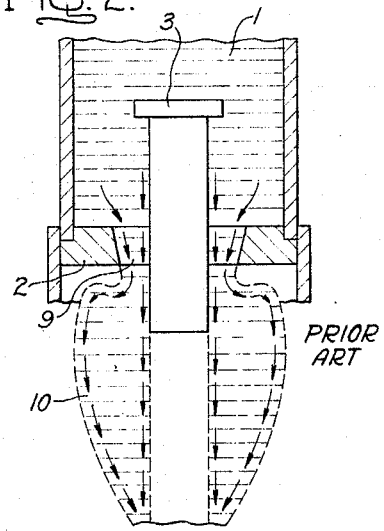
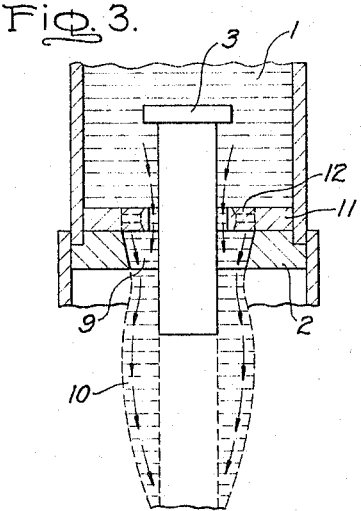
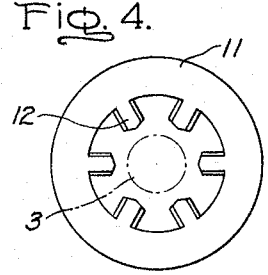
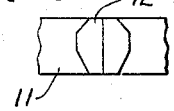
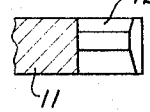
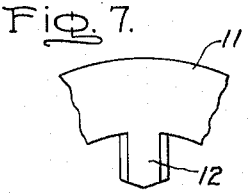
Inventor:
Karl Vatterodt
by Otto Tichy
His Attorney

United States Patent Office 3,269,821
Patented August 30, 1966

3,269,821
FURNACE FOR THE CONTINUOUS DRAWING OF QUARTZ TUBING
Karl Vatterodt, Berlin-Spandau, Germany, assignor to Patent-Treuhand-Gesellschaft für elektrische Gluhlampen m.b.H.
Filed May 22, 1963, Ser. No. 282,482
Claims priority, application Germany, June 1, 1962, P 29,532
5 Claims. (Cl. 65—187)

The present invention relates to furnaces for melting quartz, or quartz-like glasses having a high content of silicic acid similar to quartz, wherein an electrically heated cylindrical melting crucible is provided at its bottom with a nozzle through which quartz tubing is drawn continuously from the melt contained in the crucible.

In one of the well known constructions of such a furnace for the continuous drawing of quartz tubing, rods, and the like, an electrically heated cylindrical crucible consisting of a high melting point material, such as molybdenum, is surrounded by a sheath of heat insulating material which is enclosed by a water-cooled metal jacket. Heating of the crucible takes place indirectly by heating wires of tungsten, molybdenum, or the like which are mounted between the crucible wall and the heat insulating sheath in such manner that they supply heat to the crucible wall. A protective gas, such as a mixture of hydrogen and nitrogen, flows around the metal parts of the furnace during operation to avoid corrosion of such parts at the elevated temperatures, 1600° C. to 2100° C., required to melt the quartz in the crucible.

A furnace of this type is disclosed and claimed in U.S. Patent 2,998,469, patented August 29, 1961 and assigned to the assignee of the present application.

Production of quartz tubing from furnaces of this kind is accompanied by greater difficulties than those encountered in the production of glass tubing, for example, due to the higher working temperature and the higher viscosity of the quartz melt at the nozzle.

The cylindrical crucible of the furnace is filled from the top with the material to be melted, for example, natural quartz crystals in pieces of about 5 to 50 grams in weight. At a temperature of about 2000° C. and under the influence of gravity the melt flows slowly through an aperture provided in the bottom of the crucible and is continuously drawn vertically downward by a suitable tube drawing machine mounted beneath the nozzle defining the aperture.

When quartz tubing is drawn, the aperture is circular and a hollow cylindrical mandrel is mounted axially at its center. When the melt flows through the annular slot between the nozzle wall defining the aperture and the mandrel it forms a plastic quartz body having approximate rotation symmetry but which is of nonuniform and thickened wall section as compared with the drawn tubing. The body assumes the desired tubular form at a location somewhat remote from the annular slot as it is drawn out by the tube drawing machine.

The formation of such a body is caused by the construction described above in which there is less frictional resistance to the flow of the quartz melt in the region of the nozzle wall than in the region of the mandrel because the nozzle wall is of less height than the mandrel. Thus, the frictional drag on the fused molten quartz in the region of the mandrel is greater than the frictional drag on the molten quartz in the region of the nozzle wall with the result that a greater quantity of molten quartz flows past the nozzle wall than past the mandrel per unit of time. The viscosity of the molten quartz is such that the resulting uneven flow of the molten quartz causes the formation of the body which has a maximum outer diameter greater than that of the circular aperture defined by the nozzle wall.

The axially symmetrical form of the body depends on the homogeneity of the melt particularly with regard to viscosity. The natural quartz crystal always contains, however, traces of different oxides, for example $Fe_2O_3$, $Al_2O_3$, CaO, $Na_2O$ and the like, in variable quantities which affect the viscosity of the molten quartz.

The melt therefore contains regions of different viscosity which, when the melt emerges from the annular slot, cause the form of the body to deviate from the ideal axially symmetrical form desired. Bodies are formed which are completely irregular or oval in cross section. As the body is drawn out to form tubing the tubing also shows differences from the ideal circular form and uniform wall thickness desired in such tubing. Deviations of this kind in the tubing are called ovality in this art.

In accordance with the present invention it has been found that the ovality of the quartz tubing drawn from the melt remains within acceptable tolerances for use of the tubing as electric lamp envelopes, for example, when the maximum diameter of the thickened body formed when the molten quartz flows out from the nozzle is not substantially greater than that of the annular slot.

In accordance with the present invention the ovality of the fused quartz tubing drawn from the melt in crucibles of furnaces of the above type is maintained within acceptable limits by preventing the formation of a plastic quartz body having a maximum outer diameter greater than that of the diameter of the larger end opening of the nozzle. This is attained by increasing the frictional resistance to the flow of molten quartz in the region of the nozzle wall defining the aperture. It has been found that an annular plate mounted on the nozzle and inwardly of the crucible with respect to the nozzle, having an inner diameter corresponding to the maximum diameter of the outlet aperture and provided with teeth spaced apart from each other at equal angular distances and projecting radially into the flow path of the molten quartz out of the furnace is effective for this purpose. The teeth are so shaped that the flow lines of the molten quartz in the vicinity of their surfaces take a laminar course. An effective shape of the teeth in cross section is an approximate drop shape.

This structure has been found effective for decreasing the outer diameter of the molten quartz body of thickened wall section and the ovality of the quartz tubing into which the body is drawn. The tubing drawn continuously shows less deviations from the ideal circular cross section than drawn tubing produced from the melt of furnaces not equipped with the teeth bearing annular plate as described above.

The accompanying drawing shows an embodiment of the invention and like numerals of reference indicate similar parts throughout the several views.

FIG. 1 is a fragmentary side view, partly in section of the lower part of a melting furnace for the manufacture of quartz tubing, the furnace is of the construction shown and described in the above Patent 2,998,469 to which reference is made for the description of the parts of the furnace not shown;

FIG. 2 is a fragmentary, partly sectional view on an enlargened scale of part of the furnace shown in FIG. 1;

FIG. 3 is a view similar to FIG. 2 showing the annular toothed plate mounted in the crucible of the furnace in accordance with the present invention;

FIG. 4 is a plan view on a further enlarged scale of the annular toothed plate of FIG. 3;

FIG. 5 is a front view of one of the teeth of the annular plate shown in FIGS. 3 and 4 on a still larger scale;

FIG. 6 is a side view of the tooth shown in FIG. 5; and

FIG. 7 is a top view of the tooth shown in FIGS. 5 and 6.

The melting furnace for the manufacture of quartz tubing and shown in part in FIG. 1 is operated in connection with a conventional tube drawing machine which has been omitted from the drawing as forming no part of the present invention.

The furnace includes an elongated cylindrical melting crucible 1 of molybdenum sheet, for example, into which raw material, such as natural quartz rock crystal for example, is fed through a top opening. The bottom of the crucible 1 is formed by an annular nozzle plate 2 having a circular aperture and the mandrel 3 mounted on the nozzle plate 2 at the center of the circular aperture defined by the plate 2. The plate 2 and the mandrel 3 consist of molybdenum. The mandrel 3 is hollow as shown in FIG. 1 and connected therewith is a pipe 4 through which is supplied a protective gas, such as a mixture of hydrogen and nitrogen. The gas flows through the mandrel into the interior of the quartz tubing thereby preventing air penetrating through the tubing to the mandrel 3.

The crucible 1 is surrounded by an annular series of equally spaced apart heating wires 5 which extend parallel with the longitudinal axis of the crucible. The heating wires consist preferably of tungsten and a protective gas, such as the reducing gas mixture of hydrogen and nitrogen mentioned above, is passed around the wires as well as around the crucible wall to prevent oxidation of these metal parts of the furnace during operation. The series of heating wires 5 is surrounded by two heat insulating sheaths 6 and 7 of zirconium oxide, for example, which are enclosed by the water-cooled metal jacket 8. The wires are supplied with heater current by a low voltage transformer.

The inner peripheral wall of the annular nozzle plate 2 defining the circular aperture through the plate tapers inwardly in a downward direction so that the aperture is of larger diameter at the top than at the bottom of the plate 2 as shown in FIGS. 1, 2 and 3. The plate 2 is suitably approximately 20 mm. in wall thickness. The diameter of the mandrel and diameter of the aperture in the plate 2 are selected according to the dimensions of the tubing to be drawn.

The melt heated to about 2000° C. in the crucible 1 goes out of the annular nozzle slot 9 between the annular nozzle plate 2 and the mandrel 3 as indicated by the arrows in FIG. 2. It flows downwardly under its own weight along the mandrel and solidifies gradually to tubing and is drawn off below the solidification zone by a drawing machine not shown in the drawing.

The melt as it emerges from the annular nozzle slot 9 forms a molten body 10 of thickened wall section due to the lower frictional resistance to the flow of the melt offered by the inner wall of the nozzle 2 defining the aperture as compared with the frictional resistance offered by the mandrel 3 which extends an appreciable distance below the nozzle plate 2, as shown in FIG. 2. The shape and the outer diameter of the molten fused quartz body depends particularly on the viscosity and the resistance to flow in the annular slot as described above. Formation of irregular shaped thickened bodies is promoted by differences in the viscosity of the melt which results in the drawing of nonuniform, that is, oval quartz tubing, as described above.

In FIG. 3 of the drawing an annular plate 11 of molybdenum, tungsten, or the like, having a plurality of integral teeth 12 extending radially inward from its inner periphery is shown mounted in the crucible 1 directly above the nozzle plate 2 and in contact with the latter. The teeth 12 are spaced at equal angular distance from each other and project a substantial distance into the flow path of the melt as shown in FIGS. 3 and 4.

The inner diameter of the annular plate 11 is equal to the diameter of the upper end of the aperture in the nozzle plate 2, as shown in FIG. 3. When the nozzle plate is 20 mm. in wall thickness the toothed plate 11 is effectively 15 mm. in wall thickness so that the two plates extend a vertical distance of 35 mm. along the crucible 1.

The teeth 12 are about 10 mm. in maximum breadth and extend radially inward slightly more than half the distance between the inner periphery of the plate 11 and the mandrel 3 as shown in FIG. 4. Each tooth is octagonal in cross section, is slightly broader at the top than at the bottom and terminates in a broad V-shaped end facing the mandrel 3 as shown in FIGS. 4 to 7.

The teeth 12 decreases the velocity of the flow of the melt in the outer region of the flow path and the flow is laminary in the general frictional region of the teeth. As shown in FIGS. 2 and 3 the maximum outer diameter of the molten fused quartz body 10 is substantially reduced by mounting the annular toothed plate 11 in the crucible 1 of the furnace in accordance with the present invention. It has been found that ovality in the drawn quartz tubing is reduced also which results in a substantial reduction in the defects known as ovality in such drawn tubing.

What I claim as new and desire to secure by Letters Patent of the United States is:

1. An electric furnace for quartz tube drawing comprising an elongated crucible, a nozzle including an annular nozzle plate and a cylindrical mandrel mounted in the bottom of said crucible with the mandrel mounted axially in the circular aperture in said plate and defining with said plate an annular nozzle slot for the melt in the crucible, the said mandrel being substantially greater in length than the thickness of said plate, extending a substantial distance below the plate and offering greater resistance to the flow of the melt out of the crucible than the nozzle plate and means including horizontally extending teeth projecting into the flow path of the melt in the region of plate and terminating short of the mandrel for increasing the resistance to flow of the melt in the region of the plate whereby ovality of the tubing drawn from the melt is substantially reduced.

2. An electric furnace according to claim 1 wherein the said means consists of an annular plate having a plurality of teeth projecting into flow path of the melt and terminating short of the mandrel.

3. An electric furnace according to claim 1 wherein the said means consists of an annular plate mounted on the nozzle plate and having a plurality of teeth spaced at equal angular distances from each other, extending radially inward toward the mandrel and terminating short of the mandrel.

4. An electric furnace according to claim 1 wherein the said means consists of an annular plate mounted on the nozzle plate and having a plurality of teeth each of a breadth slightly larger at the top portion than at the bottom portion thereof, the teeth being spaced at equal angular disances from each other, extending radially inward toward the mandrel and terminating short of the mandrel.

5. An electric furnace according to claim 1 wherein the inner periphery of the annular nozzle plate tapers inwardly in a downward direction and the said means consists of an annular toothed plate having a center opening equal in diameter to the largest diameter of the aperture in the nozzle plate, the toothed plate being mounted on the nozzle plate with the teeth thereof projecting radially inward toward the mandrel and terminating short of the mandrel.

References Cited by the Examiner

UNITED STATES PATENTS

| | | | |
|---|---|---|---|
| 2,464,028 | 3/1946 | Danner | 65—187 |
| 2,486,737 | 11/1949 | Danner | 65—187 X |
| 2,852,891 | 9/1958 | George | 65—187 X |

DONALL H. SYLVESTER, *Primary Examiner.*

F. W. MIGA, *Assistant Examiner.*